US011340809B1

(12) United States Patent
Crowley et al.

(10) Patent No.: US 11,340,809 B1
(45) Date of Patent: May 24, 2022

(54) REDIRECTING I/O COMMUNICATIONS BASED ON NETWORK TOPOLOGY

(71) Applicant: EMC IP Holding Company LLC, Hopkinton, MA (US)

(72) Inventors: Owen Crowley, Cork (IE); Peniel Charles, Bangalore (IN); Manikandan Sethuraman, Bangalore (IN); Joseph G. Kanjirathinkal, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/083,362

(22) Filed: Oct. 29, 2020

(51) Int. Cl.
*G06F 3/06* (2006.01)
*H04L 101/622* (2022.01)
*H04L 12/46* (2006.01)

(52) U.S. Cl.
CPC .......... G06F 3/0635 (2013.01); G06F 3/061 (2013.01); G06F 3/067 (2013.01); H04L 12/4641 (2013.01); H04L 61/6022 (2013.01)

(58) Field of Classification Search
CPC ........ G06F 3/0635; G06F 3/061; G06F 3/067; H04L 12/4641; H04L 61/6022
See application file for complete search history.

(56) References Cited

U.S. PATENT DOCUMENTS

| 6,850,997 | B1* | 2/2005 | Rooney ................. | G06F 11/201 340/1.1 |
| 2009/0271540 | A1* | 10/2009 | Hirayama ............. | G06F 11/201 710/38 |
| 2017/0091007 | A1* | 3/2017 | Dasari ................... | G06F 11/079 |
| 2018/0048527 | A1* | 2/2018 | Ganjam ................ | H04L 41/12 |
| 2019/0335379 | A1* | 10/2019 | Joseph ................. | H04W 28/06 |

* cited by examiner

*Primary Examiner* — Henry Tsai
*Assistant Examiner* — John B Roche
(74) *Attorney, Agent, or Firm* — Muirhead and Saturnelli, LLC

(57) ABSTRACT

Path components associated with I/O paths between another network component and a target system may be determined, and the health of target ports on such I/O paths may be determined. Failed I/O communications may be redirected based on the determined path components and the determined health of target ports. In response to a failed I/O communication, it may be determined which of the remaining I/O paths between the host system and the storage system has the least amount of associated path components in common with the failed I/O path, and the I/O communication may be redirected on such I/O path. The redirect I/O path also may be selected based on the health ranking of target ports of the I/O paths.

20 Claims, 10 Drawing Sheets

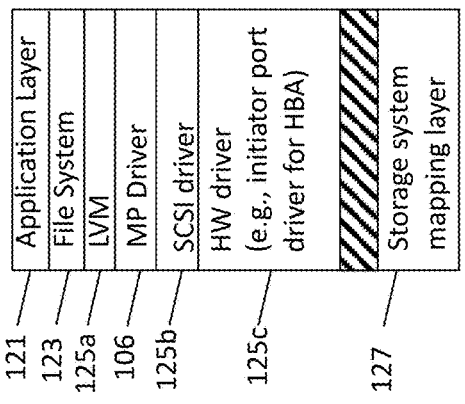
FIG. 6
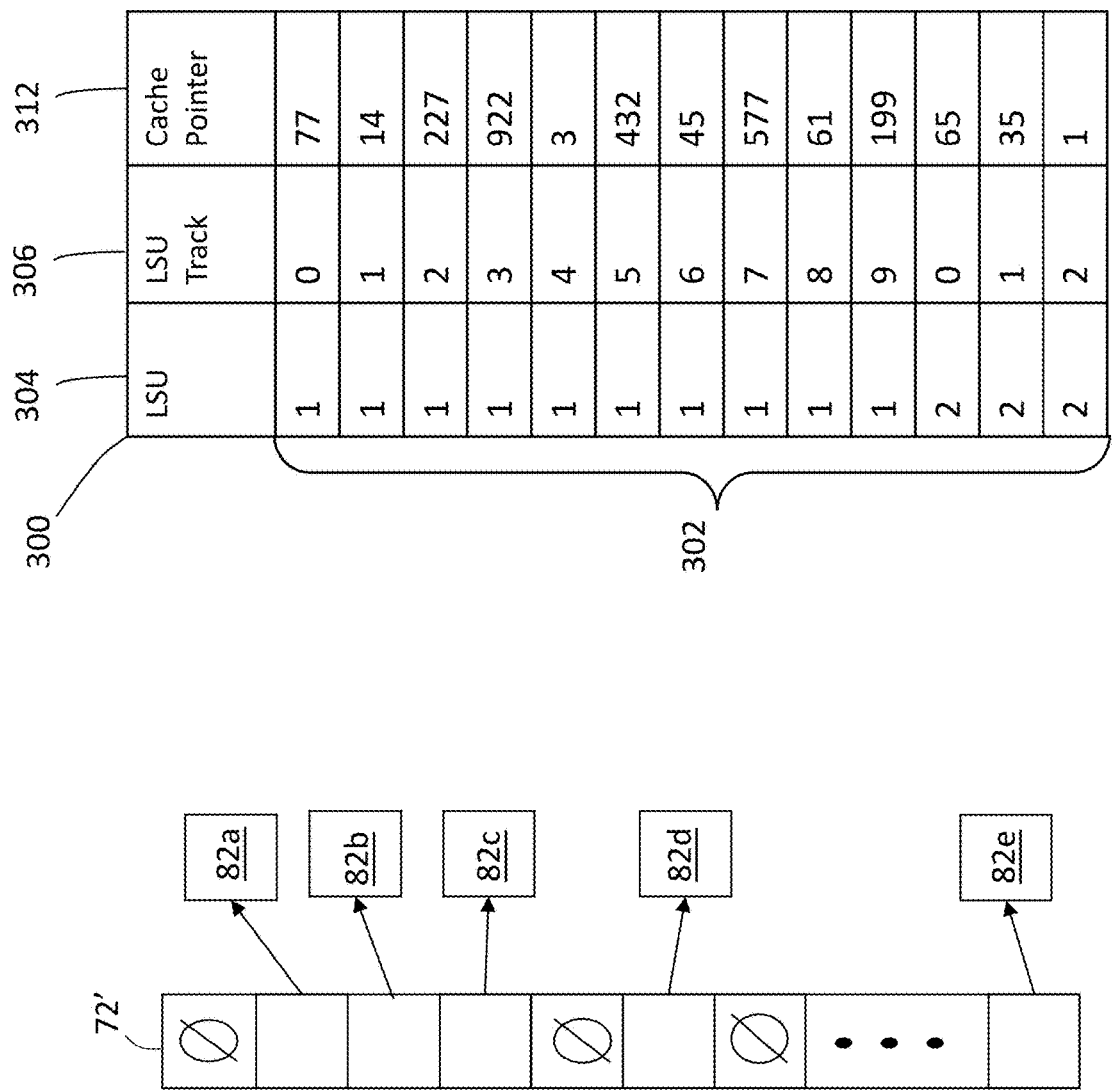
FIG. 4
FIG. 3B

FIG. 8

| LSU | Host Port | Front-End Port | Other Info |
|---|---|---|---|
| Dev0 | WWN12 | WWN45 | |
| Dev1 | WWN9 | WWN117 | |
| ... | | | |
| Devn | WWN77 | WWN6 | |

| Initiator Port | Target Port | Other Info |
|---|---|---|
| WWW1 | WWW3 | |
| WWW7 | WWW8 | |
| ... | | |
| WWW9 | WWW2 | |

| Host Port | Front-end Port | Path Components | Other Info |
|---|---|---|---|
| WWN12 | WWN211 | | |
| WWN9 | WWN990 | | |
| ... | | | |
| WWN77 | WWN33 | | |

| Rank | Front-end Port | Health Score | Other Info |
|---|---|---|---|
| 1 | WWN2 | | |
| 2 | WWN551 | | |
| ... | | | |
| n | WWN4473 | | |

1102 / 1104 / 1106 / 1108; 1110; 1100

| | Host Port | Target Port | Director | Engine | SSP | SHP | Switch | VLAN | HBA |
|---|---|---|---|---|---|---|---|---|---|
| 1301a | 714b | 744a | 744 | 745 | 720g | 720c | 720' | 725 | 714 |
| 1301b | 782b | 744a | 744 | 745 | 720g | 720d | 720' | 725 | 782 |
| 1301c | 712a | 744b | 744 | 745 | 720e | 720a | 722' | 723 | 712 |
| 1301d | 782b | 746a | 746 | 745 | 720h | 720d | 720' | 725 | 782 |
| 1301e | 714a | 746b | 746 | 745 | 722e | 722a | 722' | 727 | 714 |
| 1301f | 782a | 774a | 774 | 775 | 722f | 722b | 722' | 727 | 782 |

FIG. 13

| | FEP | Score | Other Info |
|---|---|---|---|
| 1401c | 744b | 10 | |
| 1401d | 746a | 9.7 | |
| 1401e | 746b | 8.5 | |
| 1401f | 774a | 8.2 | |
| 1401a | 744a | 6.4 | |

FIG. 14

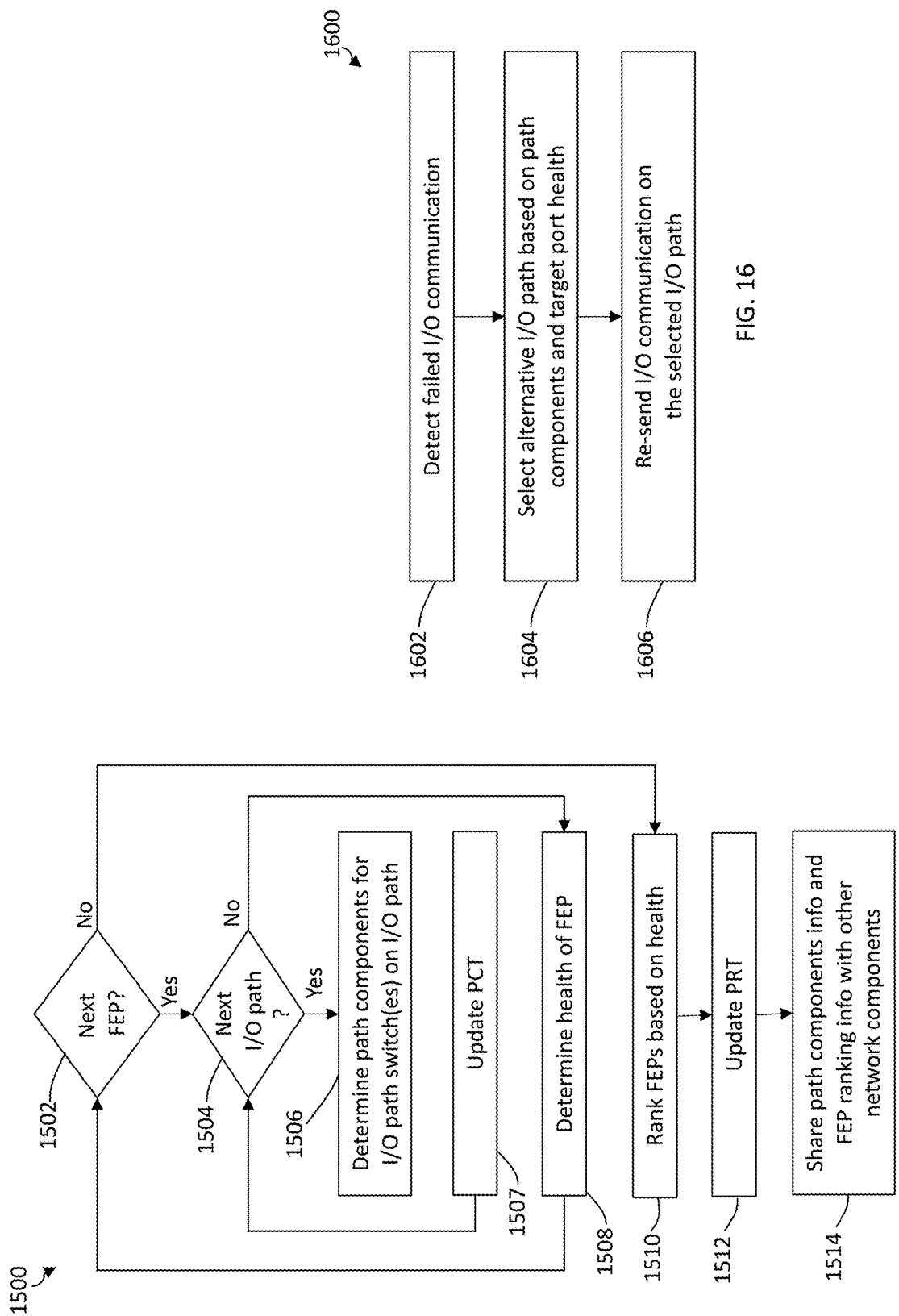

REDIRECTING I/O COMMUNICATIONS BASED ON NETWORK TOPOLOGY

BACKGROUND

Technical Field

This application generally relates to data storage networks, and more particularly to determining storage network topology with respect to ports of a storage system and determining the health of such ports, and selecting I/O paths to such ports based on the network topology, port health and physical location of such ports on the storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and storage device may be communicated may be considered an I/O path between the application and the storage device. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a data storage network including a storage system, another network component, and a plurality of permitted I/O paths between the storage system and the other network component, each permitted I/O path including a plurality of ports, each port being included within one or more path components, each path component being a physical component or a logical grouping of ports, wherein each permitted I/O path is associated with a plurality of path components, the plurality of path components including each of the one or more path components within which a port of the I/O path is included. The method includes: detecting a failed I/O communication on a first I/O path of a plurality of permitted I/O paths; determining which one or more other I/O paths of the plurality of permitted I/O paths has a least amount of associated path components in common with the first I/O path; selecting a second I/O path from among the one or more other I/O paths; and re-sending the failed I/O communication on the second I/O path. Each of the plurality of permitted I/O paths may include a storage system port, and the method further may include, for each of the plurality of permitted I/O paths, determining a health value for the storage system port included in the permitted I/O path, where the second I/O path is selected based at least in part on the health value of the storage system port of the second I/O path. The method further may include ranking the storage system ports of the permitted I/O paths based on the health values of the storage system ports, where the second I/O path is selected based at least in part on a ranking of the storage system port of the second I/O path. The method further may include determining the plurality of path components associated with each I/O path, the plurality of path components including a switch that includes two ports of the I/O path. Determining the switch may include determining a media access control (MAC) address of the switch. The method further may include determining the plurality of path components associated with each I/O path, the plurality of path components including a logical network of ports that includes two or more ports of the I/O path. Determining the logical network may include determining an IP sub-network and/or virtual local area network (VLAN) of which the two or more ports are members. The method further may include determining the plurality of path components associated with each I/O path, the plurality of path components including a storage processing node that includes a storage system port included in the I/O path. The method further may include the storage system determining the plurality of path components associated with each I/O path, and the storage system communicating the plurality of path components to the other network component, where the host system determines the one or more other I/O paths of the plurality of permitted I/O paths that have the least amount of associated path components in common with the first I/O path, selects the second I/O path from among the one or more other I/O paths, and re-sends the failed I/O communication on the second I/O path. The other network component may be a host system.

In other embodiments of the invention, a system is provided for a data storage network including a storage system, another network component, and a plurality of permitted I/O paths between the storage system and the other network component, each permitted I/O path including a plurality of ports, each port being included within one or more path components, each path component being a physical component or a logical grouping of ports, wherein each permitted I/O path is associated with a plurality of path components, the plurality of path components including each of the one or more path components within which a port of the I/O path is included. The system includes executable logic that implements a method including: detecting a failed I/O communication on a first I/O path of a plurality of permitted I/O paths; determining which one or more other I/O paths of the plurality of permitted I/O paths has a least amount of associated path components in common with the first I/O path; selecting a second I/O path from among the one or more other I/O paths; and re-sending the failed I/O communication on the second I/O path. Each of the plurality of permitted I/O paths may include a storage system port, and the method further may include, for each of the plurality of permitted I/O paths, determining a health value for the storage system port included in the permitted I/O path, where the second I/O path is selected based at least in part on the health value of the storage system port of the second I/O path. The method further may include ranking the storage system ports of the permitted I/O paths based on the health values of the storage system ports, where the second I/O path is selected based at least in part on a ranking of the storage system port of the second I/O path. The method further may include determining the plurality of path components associated with each I/O path, the plurality of path components including a switch that includes two ports of the I/O path. Determining the switch may include determining a media access control (MAC) address of the switch. The method further may include the storage system determining the plurality of path components associated with each I/O path, and the storage system communicating the plurality of path components to the other network component, where the host system determines the one or more other I/O paths of the plurality of permitted I/O paths that have the least amount of associated path components in common with the first I/O path, selects the second I/O path from among the one or more other I/O paths, and re-sends the failed I/O communication on the second I/O path.

In other embodiments of the invention, computer-readable media is provided for a data storage network including a storage system, another network component, and a plurality of permitted I/O paths between the storage system and the other network component, each permitted I/O path including a plurality of ports, each port being included within one or more path components, each path component being a physical component or a logical grouping of ports, wherein each permitted I/O path is associated with a plurality of path components, the plurality of path components including each of the one or more path components within which a port of the I/O path is included. The computer-readable media having software stored thereon, the software including: executable code that detects a failed I/O communication on a first I/O path of a plurality of permitted I/O paths; executable code that determines which one or more other I/O paths of the plurality of permitted I/O paths has a least amount of associated path components in common with the first I/O path; executable code that selects a second I/O path from among the one or more other I/O paths; and executable code that re-sends the failed I/O communication on the second I/O path. Each of the plurality of permitted I/O paths may include a storage system port, and the method further may include executable code that, for each of the plurality of permitted I/O paths, determines a health value for the storage system port included in the permitted I/O path, where the second I/O path is selected based at least in part on the health value of the storage system port of the second I/O path. The software further may include executable code that ranks the storage system ports of the permitted I/O paths based on the health values of the storage system ports, where the second I/O path is selected based at least in part on a ranking of the storage system port of the second I/O path. The software further may include executable code that controls the storage system to determine the plurality of path components associated with each I/O path, and executable code that controls the storage system to communicate the plurality of path components to the other network component, where the host system determines the one or more other I/O paths of the plurality of permitted I/O paths that have the least amount of associated path components in common with the first I/O path, selects the second I/O path from among the one or more other I/O paths, and re-sends the failed I/O communication on the second I/O path.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

FIG. 10 is a block diagram illustrating an example of a data structure for maintaining path components for I/O paths, according to embodiments of the invention;

FIG. 11 is a block diagram illustrating an example of a data structure for maintaining storage system port ranks, according to embodiments of the invention;

FIG. 13 illustrates an example of a path components table, according to embodiments of the invention;

FIG. 14 illustrates an example of a port ranking table, according to embodiments of the invention;

FIG. 15 is a flowchart illustrating an example of a method of determining path components of an I/O path and ranking storage system ports, according to embodiments of the invention; and FIG. 16 is a flowchart illustrating an example of a method of redirecting a failed I/O communication, according to embodiments of the invention.

DETAILED DESCRIPTION OF EMBODIMENTS

Figure 1:
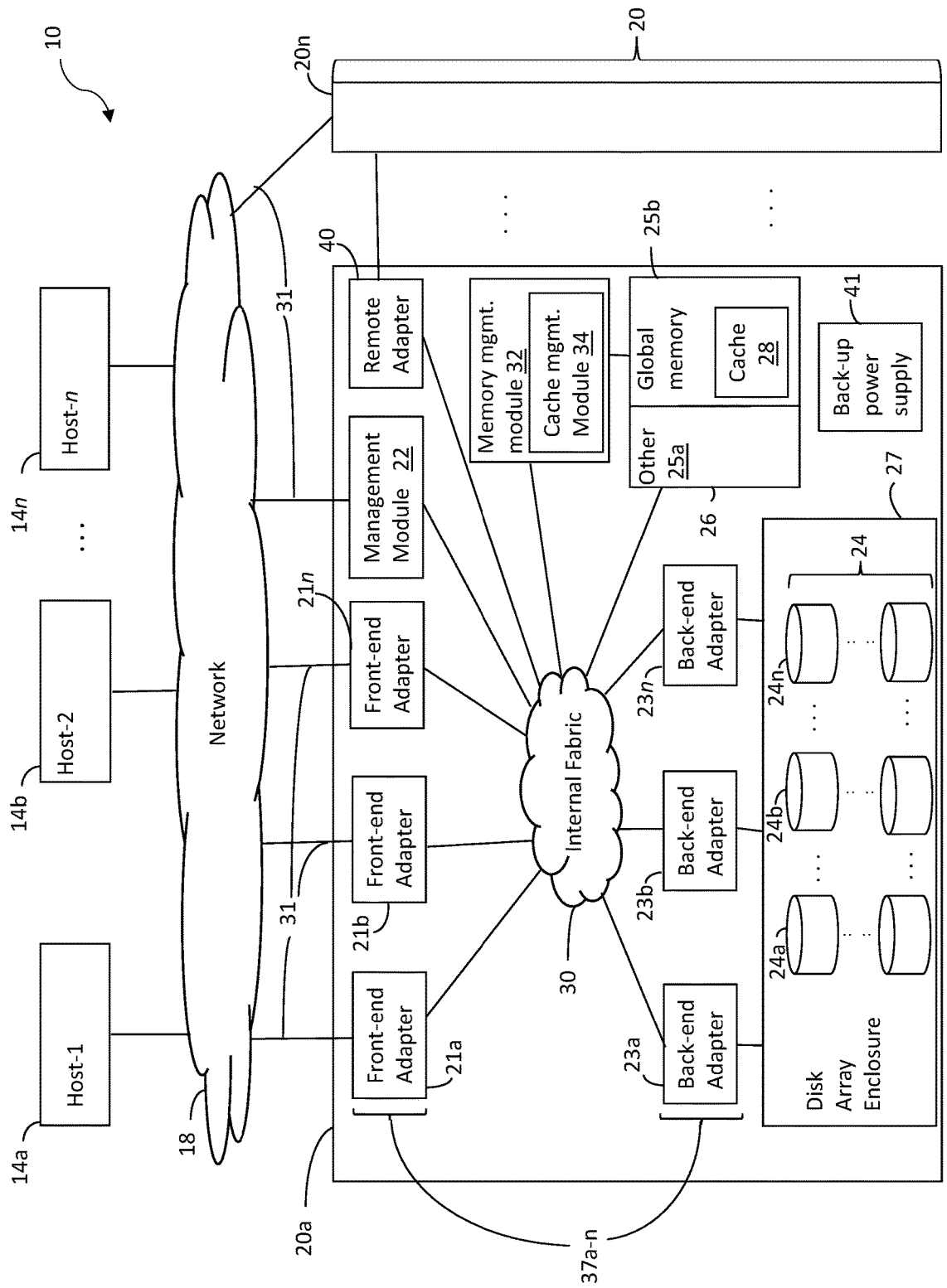
FIG. 1 is a block diagram illustrating an example of a data storage network, according to embodiments of the invention.

Some host systems are configured with knowledge of multiple I/O paths between the host system and a storage system, and include logic (e.g., embodied in a multi-path (MP) driver, as described in more detail herein) to select from among the multiple I/O paths when transmitting an I/O communication to the storage system In some cases, the host system may be configured with knowledge about the ports of the storage system (storage system ports) on the multiple I/O paths. From the perspective of the host system, and consistent with some storage network technologies (e.g., Fibre Channel (FC)), these storage system ports may be considered target ports, whereas the ports of the host system on these I/O paths, which initiate I/O operations, may be considered initiator ports. In some cases, the host system may be configured with knowledge of the physical architecture of a storage system with respect to the storage system ports. For example, the host system may be configured with knowledge that multiple target ports reside on a same physically discrete component of the storage system, for example, a same director board of a PowerMax™ storage system made available from EMC Corporation ("Dell EMC") of Hopkinton, Mass., or a same engine (e.g., that includes multiple director boards) of a PowerMax storage system. Such physical architecture of a storage system with respect to a target port may be referred to herein as the "physical context" of the target port.

In the event of a failure of an I/O communication sent from the host system to the storage system on a first I/O path, the host system (e.g., an MP driver thereof) may be configured to re-try (i.e., redirect) the I/O communication on another I/O path between the host system and the storage system. The host system may use its knowledge of the physical context of the target port to redirect the I/O communication on an I/O path whose target port is on a different physically discrete component (e.g., a different director board or engine) of the storage system than the physically discrete component of the target port of the I/O path that failed. The I/O path to which a failed I/O communication is redirected may be referred to herein as a "redirect I/O path," and the instance of the I/O communication (i.e., a copy of the failed I/O communication) sent on the redirect I/O path may be referred to herein as a "redirect I/O communication."

Even though the host system may have knowledge of the physical context of the target port, the host system may have no knowledge of the health of the target port of the redirect I/O path. If this target port is not in good health, the redirect I/O communication also may fail, causing additional delay and perhaps an unacceptable response time, which could lead to performance degradation on the storage system.

Furthermore, while the host system may have knowledge of the physical context of target ports on I/O paths, the host system may have no knowledge of the one or more network components on I/O paths between the host system and the storage system, for example, one or more switches (and switch ports thereof) on such I/O paths. For example, the host system may not know the switches (and ports thereof) on an I/O path, and not be aware that a switch (e.g., a port thereof) was the cause of an I/O communication failure. As a result, the host system may redirect the failed I/O communication on an I/O path that includes a same switch, or even a same switch port, as the failed I/O communication path, causing additional delay and perhaps an unacceptable response time, which could lead to performance degradation on the storage system.

What may be desirable is a host system having knowledge of network components on I/O paths between the host system and a target system, and having knowledge of the health of target ports on such I/O paths, so that the host system may take this information into account when redirecting failed I/O communications.

Described herein are techniques and mechanisms for determining network components on I/O paths between a host system and a target system, and determining the health of target ports on such I/O paths, and redirecting failed I/O communications based at least in part on the determined network components, determined health of target ports, and/or the physical context of target ports on the I/O paths.

In some embodiments, a plurality of path components associated with an I/O path may be determined, and failed I/O communication may be redirected based at least in part on the plurality of path components associated with a plurality of I/O paths. For example, in response to a failed I/O communication, it may be determined which of the remaining I/O paths between the host system and the storage system has the least amount of associated path components in common with the failed I/O path, and the I/O communication may be redirected on such I/O path. It may be desirable to redirect an I/O communication on an I/O path between the host system and the storage system having the least amount of associated path components in common with the failed I/O path to reduce a likelihood of another communication failure. That is, without being certain of the exact cause of an I/O failure—i.e., of what path component caused the failure—it may be desirable to redirect on an I/O path that has a best chance of not encountering the same cause of the failure, e.g., the I/O path with the least amount of associated path components in common with the failed I/O path.

Each port on an I/O path may be included within one or more path components. The plurality of path components of an I/O path may include (e.g., consist of) the one or more path components that include each port on the I/O path. The one or more path components that include a port may include: physical components; and logical groupings of ports. The physical components including a port may include, but are not limited to: a switch; am HBA; and physically discrete components of a storage system, for example, a director board or an engine. The logical groupings of ports may include, but are not limited to a fabric, a VLAN or an IP sub-network.

In some embodiments, the target ports of the storage system are ranked based on their health, and the redirect I/O path is selected based at least in part on the ranking of the target ports of the I/O paths from among which the redirect I/O path was selected.

In some embodiments, the storage system may determine the path components of I/O paths between a host system and a target system, determine the health of target ports on such I/O paths, and share this information, perhaps along with target port context information, with a host system. The host system (e.g., an MP driver on the host system) may use this shared information to redirect failed I/O communications, as described in more detail elsewhere herein.

In some embodiments, the storage network on which the host system and the storage system reside is an Ethernet-based storage network, meaning that components of the network (e.g., host systems, storage systems and switches) exchange I/O communications on the storage network in accordance with one or more Ethernet-based protocols such as, for example, iSCSI, Fibre Channel over Ethernet (FCoE) and NVMe-over-TCP. In such embodiments, determining the path components of an I/O path may include any of: determining the media access control (MAC) address of one or more switches, and/or ports thereof, on the I/O path, determining a virtual local area network (VLAN) and/or IP sub-network to which the ports on the I/O path belong.

While it may be physically possible to exchange I/O communications on an I/O path, such communication may be logically restricted, for example, by masking tables, zoning table VLAN tables or the like, as described in more detail elsewhere herein. The I/O paths on which I/O is permitted between a host system and a storage system, e.g., based on such logical restrictions, may be referred to herein as "permitted I/O paths." Thus, while embodiments of the invention are described in relation to I/O paths generally, the invention is not so limited. In some embodiments, the I/O paths for which path components are determined, the target ports for which health is determined, and/or the redirecting of I/O communications based on these determinations are limited to permitted I/O paths.

It should be appreciated that while embodiments of the invention are described in relation to I/O paths between a host system and a storage system, the invention is not so limited. The techniques and mechanisms described herein may be applied to redirecting communications between other network components of a storage network, or components of a different type of network altogether. For example, the techniques and mechanisms described herein may be applied to redirecting communications between a storage system and: another storage system; a backup appliance, and/or any other type of network component of a storage network.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14*a*-*n*; network 18; one or more storage systems 20*a*-*n*; other components; or any suitable combination of the foregoing. Storage systems 20*a*-*n*, connected to host systems 14*a*-*n* through network 18, may collectively constitute a distributed storage system 20. All of the host computers 14*a*-*n* and storage systems 20*a*-*n* may be located at the same physical site, or, alternatively, two or more host computers 14*a*-*n* and/or storage systems 20*a*-*n* may be located at different physical locations. Storage network 10 or portions thereof (e.g., one or more storage systems 20*a*-*n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a*-*n* may access the storage system 20*a*, for example, in performing input/output (I/O) operations or data requests, through network 18. For example, each of hosts 14*a*-*n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14*a*-*n* and the storage systems 20*a*-*n* included in the storage network 10 may be connected to the network 18 by any one of a variety of connections as may be provided and supported in accordance with the type of network 18. The processors included in the host computer systems 14*a*-*n* may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14*a*-*n* may issue an I/O request to the storage system 20*a* to perform an I/O operation. For example, an application executing on one of the host computers 14*a*-*n* may perform a read or write operation resulting in one or more I/O requests being transmitted to the storage system 20*a*.

Each of the storage systems 20*a*-*n* may be manufactured by different vendors and interconnected (not shown). Additionally, the storage systems 20*a*-*n* also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14*a*-*n*, for example, to the storage systems 20*a*-20*n*. It should be appreciated that the particulars of the hardware and software included in each of the components that may be included in the storage systems 20*a*-*n* are described herein in more detail, and may vary with each particular embodiment.

Each of the storage systems, such as 20*a*, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24*a*-*n*. In some embodiments, one or more physical storage devices (e.g., one of the rows 24*a*-*n* of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof— e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
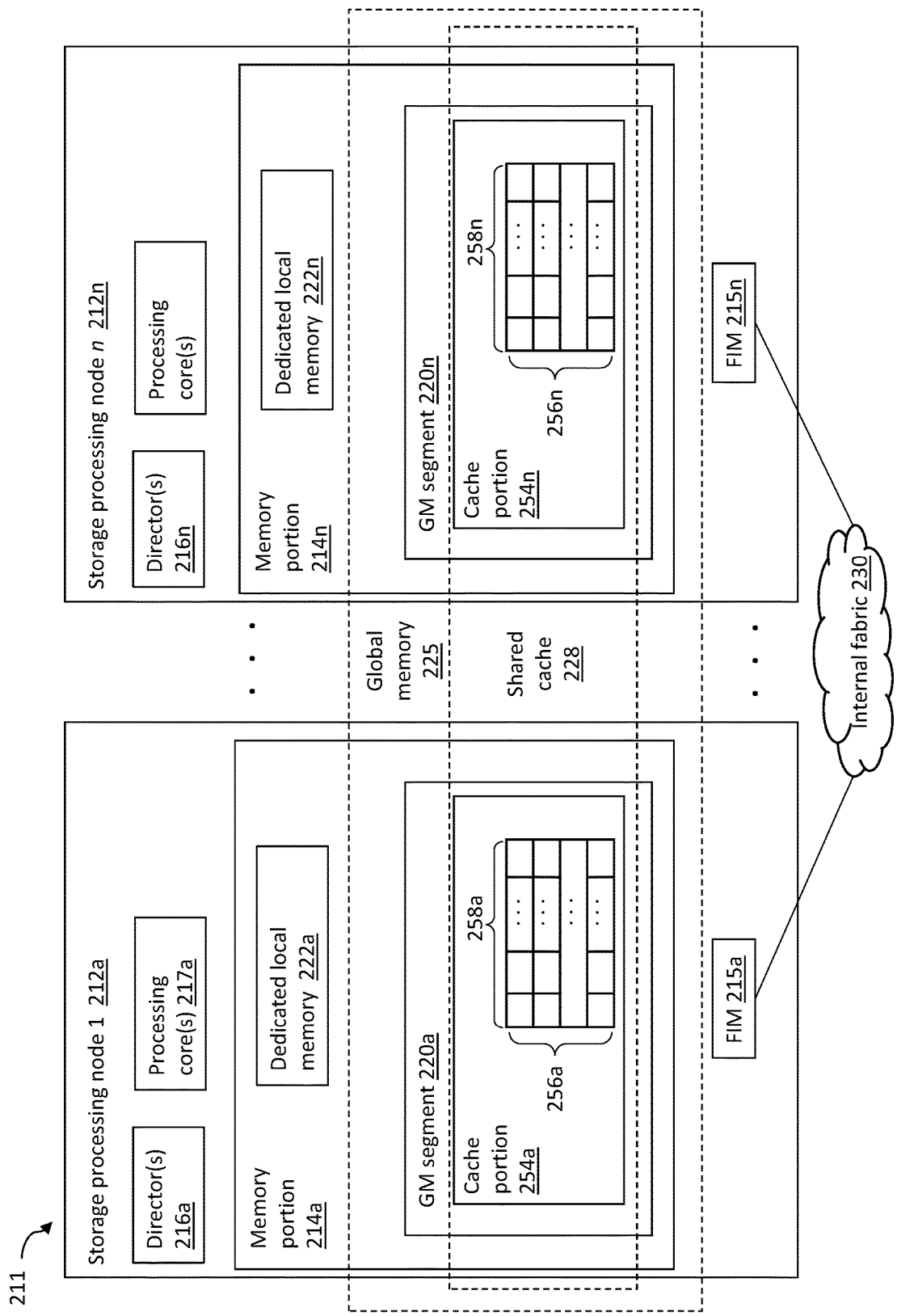
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
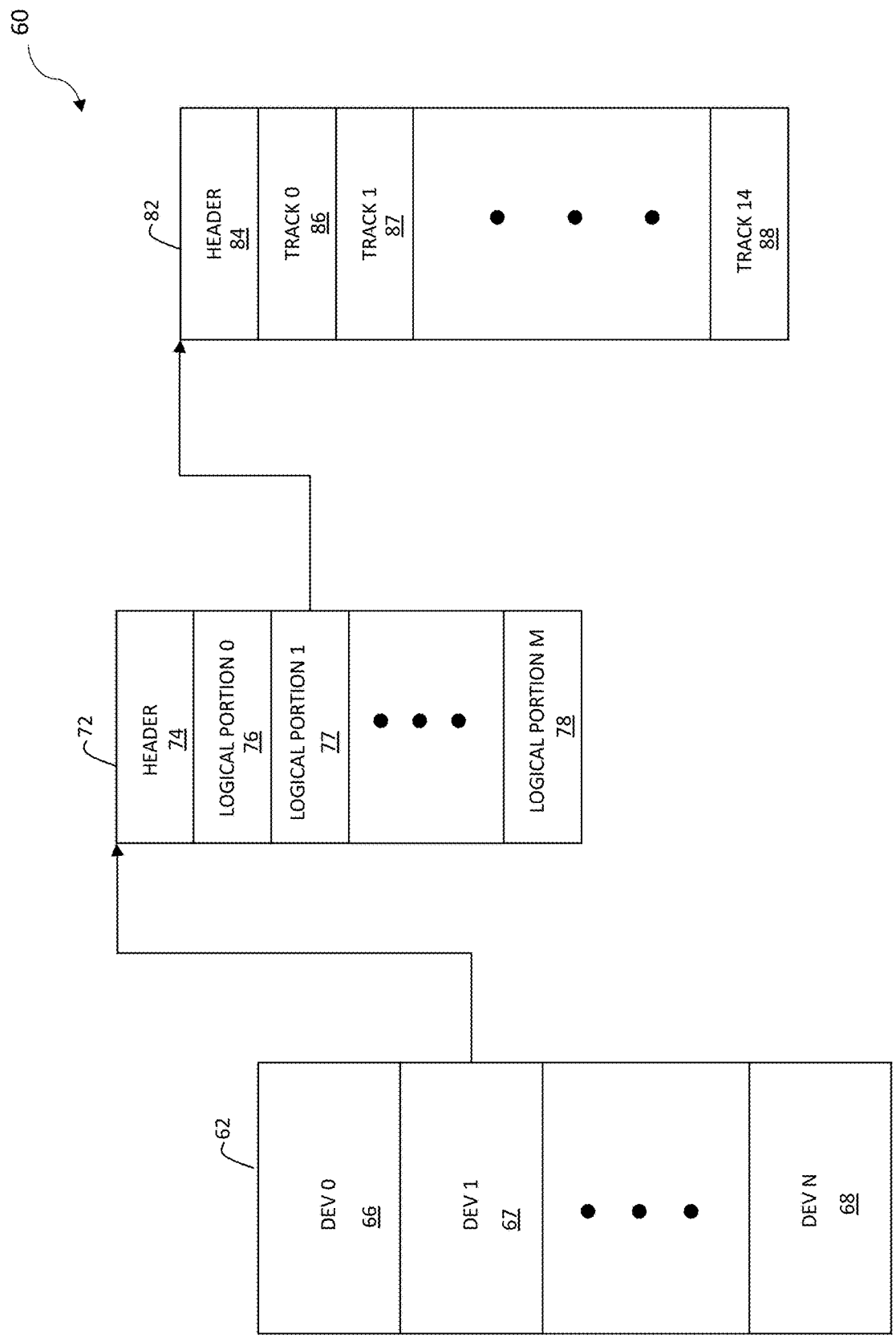
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header 74 that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21*a*-*n*. In addition, RA 40 and/or the BEs 23*a*-*n* may also use and locally store portions of the tables 62, 72, 72', 82 and 300. Other data structures may be stored in any of GM 25*b*, memory 25*a*, GM segment 220*a*-*n* and/or dedicated local memories 22*a*-*n*.

Figure 5:
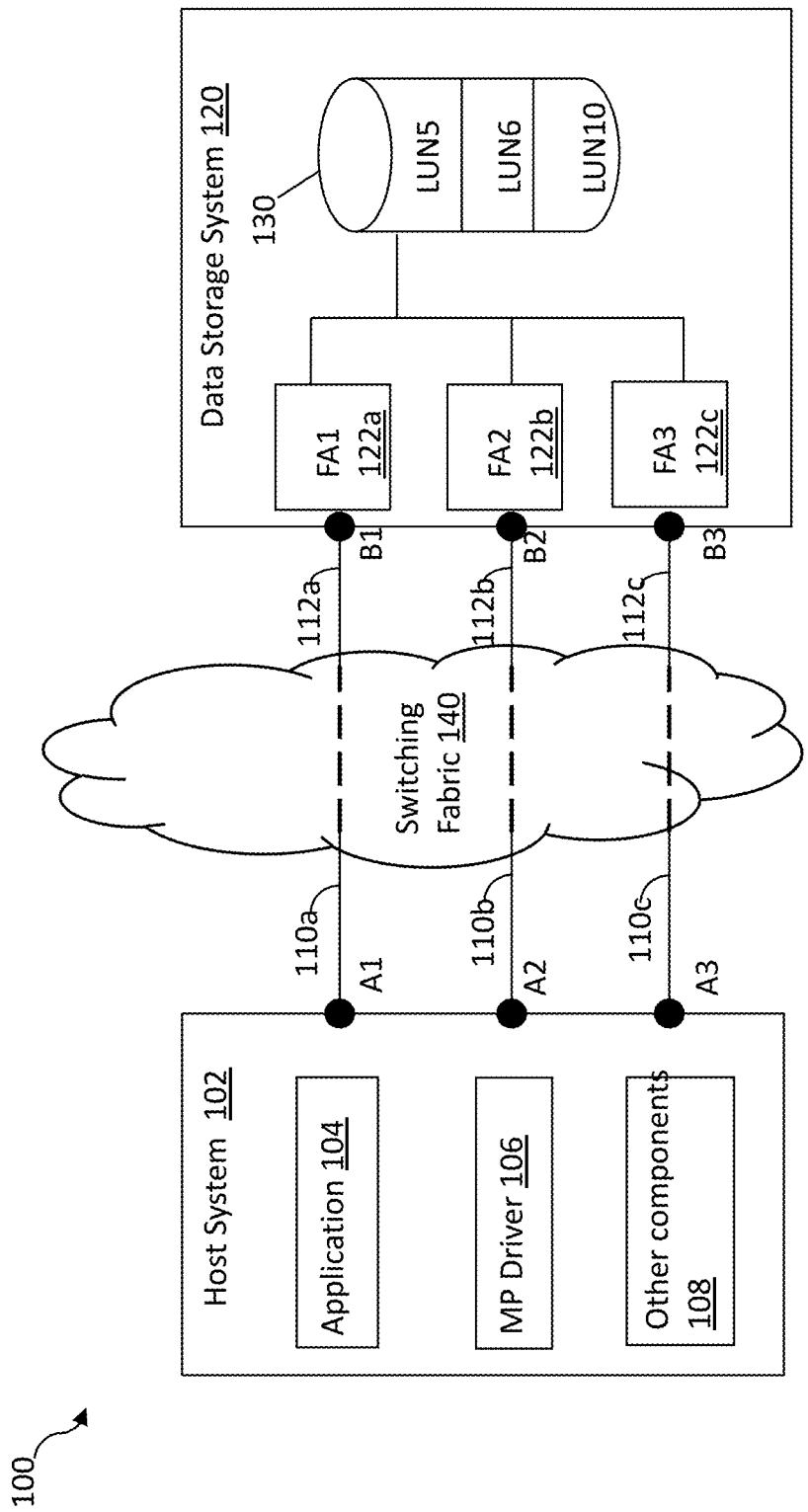
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20*a*-*n* and/or one or more hosts 14*a*-14*n*, or variation thereof.

The system 100 may include a host system 102, switching fabric 140 (including one or more switches not shown) and data storage system 120. The host system 102 and data storage system 120 may communicate over one or more I/O paths through the switching fabric 140. Elements 110*a*-110*c* denote connections between the host system 102 and switching fabric 140. Element 112*a*-112*c* denote connections between the data storage system 120 and the switching fabric 140. Thus, switching fabric 140 may more generally considered a network providing the connectivity between the host system 102 and data storage system 120. The element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, and a single data storage system 120 for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122a-122c, also denoted respectively as host adapters FA1, FA2 and FA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an FA of the data storage system 120. In the example of the system 100, elements A1, A2 and A3 each denote a port of a host system 102 (e.g., a port of an HBA), and elements B1, B2 and B3 each denote a port of an FA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an FA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an FA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an FA (e.g., such as B1-B3 of FIG. 5) in the data storage system. Through each such I/O path, one or more LSUs may be visible or exposed to the host system initiator through the target port of the data storage system.

Figure 7:
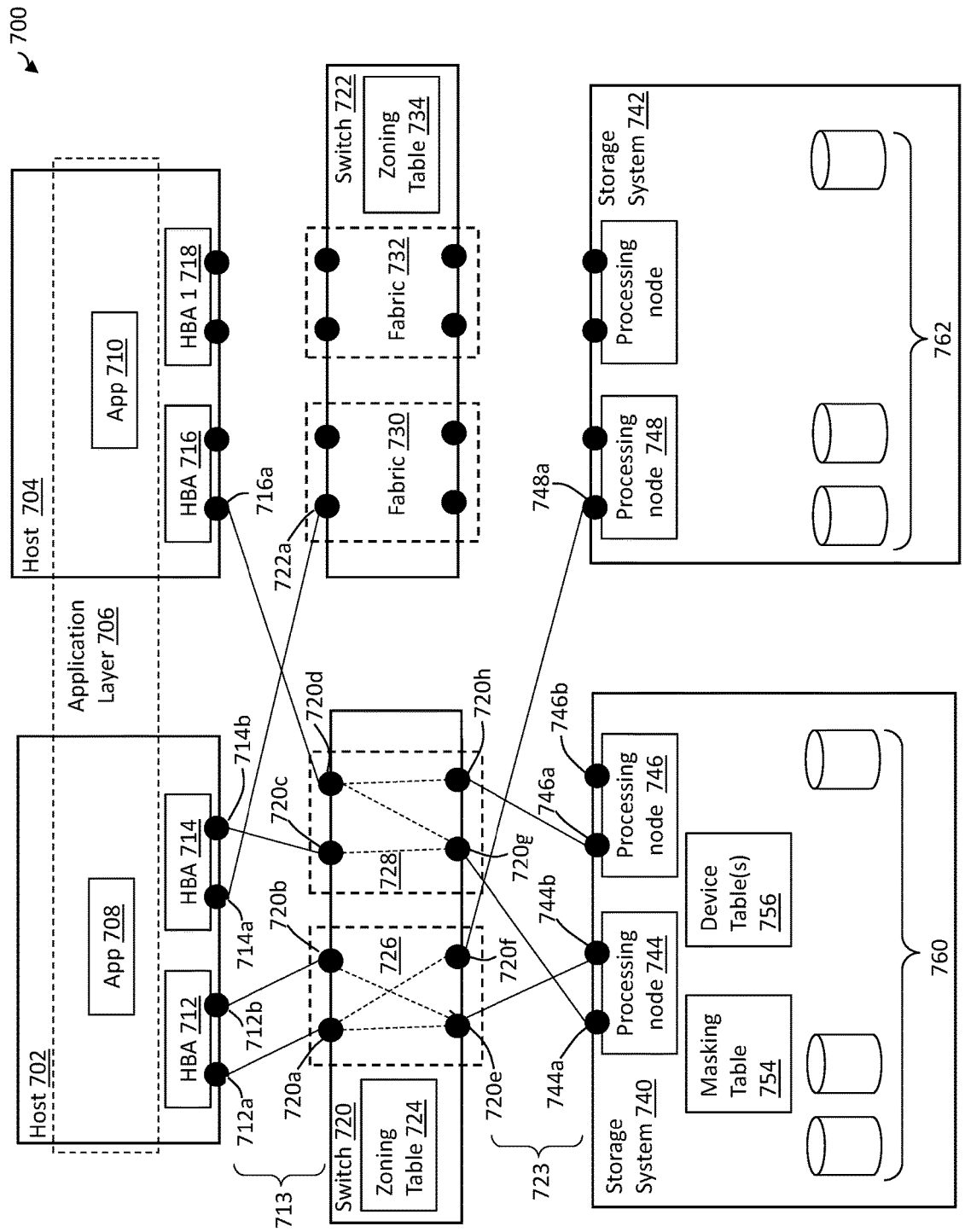
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712a, 712b, 714a and 714b. The portion of application layer 706 running on host 702 may include application 708 and one or more other applications. HBA 712 may include host ports 712a and 712b, and HBA 714 may include host ports 714a and 714b. HBAs 712 and 714 each may be separate discrete logical or physical components of host 702, and host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713, which may be referred to herein as "host port links." Each such physical connection may be a cable and, in some embodiments, there is only enabled one physical connection between each host port and SHP (e.g., in accordance with a technology standard (e.g., FC)) as illustrated in FIG. 7. That is, in some embodiments, each SHP is dedicated to one host port. FIG. 7 illustrates host ports 712a, 712b, 714a, 714b and 716a connected to SHPs over physical connections 713 in which there is only one physical connection 713 between each host port and each SHP.

Host 704 may include any of: a portion of the application layer at 706; application 710; HBAs 716 and 718; and multiple host ports including host port 716*a* of HBA 716.

The switch 720 may include any of: zoning table 724, fabrics 726 and 728; ports 720*a-h*; other components; or any suitable combination of the foregoing. Each of ports 720*a-h* ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723, which may be referred to herein as "FEP links." Each such physical connection may be a cable and, in some embodiments, there is only enabled one physical connection between each SSP and FEP (e.g., in accordance with a technology standard (e.g., FC)) as illustrated in FIG. 7. That is, in some embodiments, each SSP is dedicated to an FEP. FIG. 7 illustrates FEPs 744*a*, 744*b* and 746*a* connected to SSPs 720*g*, 720*a* and 720*h*, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712*a*, 712*b*, 714*a*, 714*b* and 716*a*, are enabled to communicate with which FEPs, for example, 744*a*, 744*b*, 746*a*, 746*b* and 748*a*. Zoning tables are described in more detail elsewhere herein. The switch 720 may use the information in the zoning table 724 to determine the internal switch connections between SHPs and SSPs to implement the defined zones, as illustrated by the dashed lines within switch 720 in FIG. 7. Zoning table 724 or another data structure on switch 720 may define one or more logical fabrics, including logical fabrics 726 and 728, for example, by specifying the switch ports that are members of the logical fabrics.

A logical fabric is a logical entity that includes one or more SHPs and one or more SSPs as its members, for which I/O connectivity associated with the logical fabric are only permitted between the member SHPs and SSPs, and not with any SHP or SSP that is not a member of the fabric. A logical fabric may include SHPs and/or SSPs from different switches, or may include only SHPs and/or SSPs of a single switch, for example, all of the SHPs and/or SSPs of a switch or a subset thereof. A logical fabric may be considered to define a virtual SAN (i.e., "VSAN"). Each logical fabric may have a unique identifier referred to herein as a "fabric name," which may be synonymous with a VSAN name. For example, a data structure on the switch 720 or elsewhere may define that logical fabric 726 includes ports 720*a*, 720*b*, 720*e* and 720*f*.

The switch 722 may include any of: zoning table 734, logical fabrics 730 and 732; several ports including port 722*a*; other components; or any suitable combination of the foregoing. In some embodiments, one or both of switches 720 and 722 may be a Dell EMC Connectrix™ switch or director made available by Dell EMC.

The storage system 740 may include any of: masking table 754; device table(s) 756; s 744 and 746; FEPs 744*a*, 744*b*, 746*a* and 746*b*; BEs (not shown); physical storage devices 760; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712*a*, 712*b*, 714*a*, 714*b*, 716*a*) are permitted to communicate with which LSUs over which FEPs (e.g., 744*a*, 744*b* 746*a*, 746*b*). Masking tables are described in more detail elsewhere herein.

The storage system 742 may include any of the same or similar components as storage system 740, including processing node 748 and FEP 748*a* thereof, physical storage devices 762, connectivity issue logic (not shown); and connectivity issue objects (not shown). In some embodiments, storage systems 740 and/or 742 may be a storage system 20*a* and/or 120 described in relation to FIGS. 1 and 5, respectively, or include one more components and/or functionality thereof.

Storage systems (e.g., the storage systems 740 and/or 742) may maintain data structures (e.g., masking tables) that define I/O connectivity in terms of LSUs, FEPs and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which FEPs (e.g., SCSI targets). Defining (including initially defining and later modifying) which host ports are permitted to perform I/O communications with which LSUs over which FEPs, for example, using a masking table or other data structure, may be referred to as configuring or defining I/O connectivity between a host port, FEP and LSU, or more simply as "masking."

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate I/O over the FEP identified in column 806. Other information, for example, a host ID of the host system on which the host port resides, the HBA of the host port, other information relating to the host port learned during host registration, the FA associated with the FEP, a processing node (e.g., director board) on which the FEP resides, other physically discrete components of the storage system (e.g., an engine including the director board) within which the FEP resides, fabric name, and other information relating to the FEP, may be specified in column 808. A data structure other than a table, for example, a linked list and/or object-oriented data structure, may be used to record the same information.

To properly configure I/O connectivity between host ports, FEPs and LSUs, it may be necessary to know the permissible I/O paths between host ports and FEPs (e.g., across a switching fabric), which may be defined by zoning tables on one or more switches of a switching fabric. Switches may include zoning tables that define the logical connections between SHPs and SSPs of the switch; e.g., by specifying pairs of host port IDs (e.g., WWNs) and FEP IDs (WWNs), each pair specifying a host port ID and an FEP ID, each identified host port corresponding to a directly connected (e.g., by an FC cable) SHP of the switch and each identified FEP corresponding to a directly connected SSP of the switch. Thus, the zoning table of a switch defines permissible I/O paths between a host system and a storage system over the switch, each I/O path defined by (and including) a host port and an FEP. Such I/O paths may be referred to herein as "zoned I/O paths" or "enabled I/O paths," and the process of defining (including initially defining and later modifying) enabled I/O paths in a zoning table, or the resulting enabled I/O paths collectively, may be referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port is permitted to communicate over a switching fabric. Other information, for example, host, HBA, FA, processing node (e.g., director board), other physically discrete components the storage system (e.g., an engine including the director) corresponding to the target port, fabric name, etc., may be specified in column 906, where fabric name is an identifier of the logical fabric to which the specified initiator port and target port belong. A data structure other than a table, for example, a linked list and/or object-oriented data structure, may be used to record the same information.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a unique host ID (e.g., a host name), host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments, one or more of the data structures 62, 72, 72', 82, 800 and 900 may be augmented with information for managing bandwidth in connection with FEPs as described herein. In other embodiments, separate data structures may be provided for managing bandwidth in relation to FEPs of a storage system, which may include data structure 1000 described in more detail elsewhere herein. It should be appreciated that one or more of the data structures 62, 72, 72', 82, 800, 900 and 1000, or information contained therein, may be combined in one or more data structures, either as a variation of the one of the foregoing data structures or in a different data structure altogether.

In some embodiments of the invention, path components of I/O paths may be determined and maintained, for example, on a storage system. FIG. 10 is a block diagram illustrating an example of a data structure 1000 for maintaining path components for I/O paths between a host system and a storage system, according to embodiments of the invention. Other embodiments of a data structure for maintaining path components for I/O paths, for example, variations of the data structure 1000, are possible and are intended to fall within the scope of the invention. One or more other types of data structures, for example, object-oriented data structures and/or linked lists, may be used in addition to, or as an alternative to, a table. The data structure 1000 may be referred to herein as a "path component table" or "PCT."

The PCT 1000 may include a plurality of entries 1010, each entry representing an I/O path between the storage system and the host system. Each entry 1010 may include an ID (e.g., WWN) of the host port (i.e., initiator port) of the I/O path represented by the entry in a host port column 1002. Each entry 1010 also may include an ID (e.g., WWN) of the front-end port (FEP; i.e., target port) of the I/O path represented by the entry in an FEP column 1004. The host port ID and FEP ID specified in each entry 1010 may together define the I/O path represented.

Each entry 1010 may specify a plurality of path components associated with the I/O path represented by the entry in the path component column 1006, including, but not limited to: a switch; two or more switch ports; a VLAN or logical fabric that includes the two or more switch ports; an IP sub-network that includes two or more switch ports; one or more physically discrete components of the storage system, e.g., a director board and/or engine, that include the FEP; and other path components. Each of the one or more switches specified in the path components column 1006 may be specified using any of a variety of identifiers, which may depend on one or more storage network protocols for which the storage network is configured. For example, if the storage network is an Ethernet-based network, the switch may be specified using a MAC address.

Each of the one or more switch ports specified in the path components column 1006 may be specified using any of a variety of identifiers, which may depend on one or more storage network protocols for which the storage network is configured. For example, if the storage network is an FC-based network, each switch port may be identified by a WWN. If the storage network is an Ethernet-based network, the switch may be specified using a MAC address. In some embodiments, the storage network may be configured to implement both FC-based and Ethernet-based networks, in which case each port may be specified by both a MAC address and a WWN.

Each of the logical port groupings specified in the path components column 1006 may be specified using any of a variety of identifiers, which may depend on one or more storage network protocols for which the storage network is configured. For example, if the storage network is an FC-based network, the logical port grouping may be a logical fabric identified by a fabric ID (e.g., a fabric name). If the storage network is an Ethernet-based network, the logical port grouping may be specified using a VLAN ID and/or an IP subnet address. In some embodiments, the storage network may be configured to implement both FC-based and Ethernet-based networks, in which case a logical port grouping may be a logical specified by both a fabric ID and a VLAN ID.

It should be appreciated that, rather than a single path components column 1006 for specifying all of the path components of an I/O path, the PCT 1000 may include multiple columns, where a separate path component is specified in each column. Further, the PCT 1000 may include separate columns for different types of path components, for example, one column for specifying physical components that include ports and another column for specifying groupings of ports.

Each entry 1010 also may include other information associated with the I/O path represented by the entry in one or more other columns (e.g., other info column 1008). Such other information may include any information associated with the I/O path described herein.

The information stored in the PCT 1000 may be used to redirect I/O communications, as described in more detail elsewhere herein.

In some embodiments of the invention, FEPs (e.g., target ports) of a storage system may be ranked based on health, and these rankings may be maintained, for example, on a storage system. FIG. 11 is a block diagram illustrating an example of a data structure 1100 for maintaining FEP ranks, for example, based on health, according to embodiments of the invention. Other embodiments of a data structure for maintaining FEP ranks, for example, variations of the data structure 1100, are possible and are intended to fall within the scope of the invention. One or more other types of data structures, for example, object-oriented data structures and/or linked lists, may be used in addition to, or as an alternative to, a table. The data structure 1100 may be referred to herein as a "port ranking table" or "PRT."

The PRT 1100 may include a plurality of entries 1110, each entry representing a target port of a storage system. Each entry 1110 may include a rank of the target port represented by the entry in rank column 1102. Alternatively, rather than having a rank column, a position of an entry within an order of the entries 1110 may be indicative of the rank of the target port represented by the entry.

Each entry 1110 also may include an ID (e.g., WWN) of the front-end port (FEP; i.e., target port) of the I/O path represented by the entry in an FEP column 1104. Each entry 1010 also may include a health score in health score column 1106 and other information in the column 1108, where the rankings of the FEPs may be based on the respective health scores of the FEPs. The health score of each FEP may be based on any of a variety of information about the FEP, and determined in any of a variety of ways, including, for example, according to any of a variety of formulas, as described in more detail elsewhere herein.

The information stored in the PRT 1100 may be used to redirect I/O communications, as described in more detail elsewhere herein.

The information that may be included in the PCT 1000 and/or PRT 1100 as described herein may be maintained in one or more other data structures in addition to, or as an alternative to, the PCT 1000 and/or PRT 1100, which may be derived from, or completely independent of, the PCT 1000 and/or PRT 1100. For example, one or more pieces of such information may be stored in a masking table (e.g., 800) or a zoning table (e.g., 900). Further, one or more indexes may be derived from the PCT 1000 and/or PRT 1100, in which one or more pieces of information described in relation to the PCT 1000 and/or PRT 1100 may be an index key.

Figure 12:
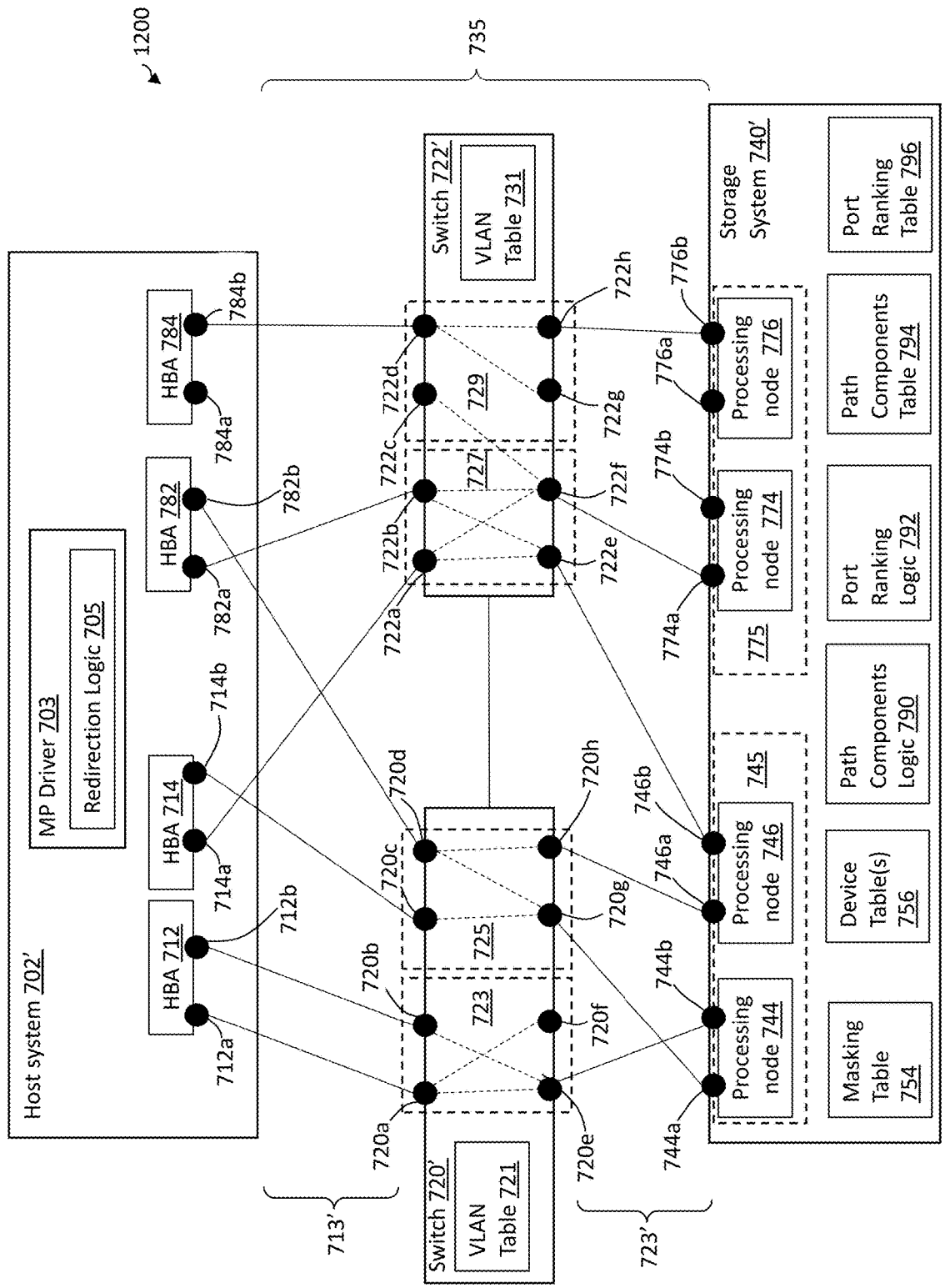
FIG. 12 is a block diagram illustrating an example of a system for managing I/O communications on storage network, according to embodiments of the invention.

FIG. 12 is a block diagram illustrating an example of a storage network 1200 for redirecting I/O communications based on path components of I/O paths and target port health, according to embodiments of the invention. Other embodiments of a storage network I/O for redirecting I/O communications based on path components of I/O paths and target port health, for example, variations of the system 1200, are possible and are intended to fall within the scope of the invention. The system 1200 may be a variation of the system 700, modified to redirect I/O communications based on path components of I/O paths and target port health. Elements that appear in both FIGS. 7 and 11, may not be described again in relation to FIG. 11, in which case such elements are the same as described in relation to FIG. 7.

FIG. 12 illustrates an embodiment of the invention in which I/O communications between the storage system 740' and the host system 702' are redirected based on path components of I/O paths between the storage system 740' and the host system 702' across physical connections 723', switches 720' and 722' and physical connections 713'.

The storage network 1200 may include any of: a host 702'; switching fabric 735; a storage system 740'; other components; or any suitable combination of the foregoing. The switching fabric 735 may include any of: switches 720' and 722'; physical connections 713' and 723'; other components; or any suitable combination of the foregoing. It should be appreciated that, while only one host 702' is shown, system 1200 may have a plurality of hosts, perhaps including tens, hundreds or even thousands more. The host 702' may be a physical host system or virtual system as part of a virtualized environment, and may be part of a host cluster and/or distributed across multiple physical devices and/or part of a cloud environment. The host 702' may be a host system 102 described in relation to FIG. 5 or include any of the components thereof described herein.

The host 702' may include any of: an MP driver 703 (e.g., MP Driver 106); HBAs 712, 714, 782 and 784; and host ports 712a, 712b, 714a, 714b, 782a, 782b, 784a and 784b. The MP driver 703 may include redirection logic 705, which may be configured to redirect failed I/O communications based on path components associated with I/O paths and target port health, for example, as described in more detail elsewhere herein. The HBA 712 may include host ports 712a and 712b; the HBA 714 may include host ports 714a and 714b; the HBA 782 may include host ports 782a and 782b; and the HBA 784 may include host ports 784a and 784b. HBAs 712, 714, 782 and 784 each may be separate discrete logical or physical components of host 702', and host 702' may include more or less than the four HBAs illustrated.

Each of the host ports 712a, 712b, 714a, 714b, 782a, 782b, 784a and 784b may be connected to a switch port of switch 720' or 722' (each such switch port referred to herein as a "switch host port," "SHP" or "fabric port") by physical connections 713', which may be referred to herein as "host port links." Each such physical connection 713' may be a cable and, in some embodiments, there is only one enabled physical connection between each host port and an SHP (e.g., in accordance with a technology standard (e.g., FC)) as illustrated in FIG. 12. That is, in some embodiments, each SHP is dedicated to one host port. FIG. 12 illustrates host ports 712a, 712b, 714a, 714b, 782a, 782b and 784b connected to SHPs 720a, 720b, 722a, 720c, 722b, 720d and 722d, respectively, over physical connections 713' in which there is only one physical connection 713' between each host port and each SHP.

The switch 720' may include any of the components of 720', and also may include a VLAN table 721. The VLAN table 721 may include a plurality of entries, each entry representing a VLAN, for example, one or VLANs 723, 725, 727 and 729. Each entry may include a VLAN ID and may specify the plurality of ports of one or more components (e.g., switches 720' and 722') of the switching fabric 735 that are included in the VLAN represented by the entry. The VLAN table 721 may serve a function for, and have attributes specific to, an Ethernet-based storage network that are analogous to the function served by a zoning table (e.g., the zoning table 1000) in a FC-based network and the attributes thereof. The VLAN table 721 may define the permitted logical connections between SHPs and SSPs of the switches 720' and 722'; e.g., by specifying, within each entry of the VLAN table, one or more pairs of host port IDs (e.g., MAC addresses and/or IP addresses) and FEP IDs (e.g., MAC addresses and/or IP addresses). Each such pair may specify a host port ID and an FEP ID, each identified host port corresponding to a directly connected (e.g., by a cable or fiber) SHP of a switch and each identified FEP corresponding to a directly connected SSP of a switch.

Other information, for example, host ID, HBA, FA, processing node (e.g., director board), other physically discrete components of the storage system (e.g., an engine including the director) corresponding to the target port, fabric name (e.g., of a fabric corresponding to the VLAN), etc., may be included in each entry of the VLAN table 721. Thus, the VLAN table 721 may define permissible I/O paths between the host system 702' and the storage system 740' over the switching fabric 735, each I/O path defined by (and including) a host port and an FEP. A data structure other than a table, for example, a linked list and/or object-oriented data structure, may be used to record the same information.

The switch 722' may include any of: VLAN table 731, ports 722a-h; other components; or any suitable combination of the foregoing. In some embodiments, the switch 722' may be a Dell EMC Connectrix™ switch or director made available by Dell EMC. The VLAN table 731 may include the same of similar information as the VLAN table 721.

While not illustrated in FIG. 12, it should be appreciated that the switching fabric 735 may include multiple switches connected between a host port of the host system 702' and an FEP of the storage system 740'. For example, for an I/O path including FEP 774a, SSP 722f, SHP 722b and host port 782a, there may be one or more other switches connected between the SHP 722b and the host port 782a, such that I/O path includes two or more additional switch ports. In such embodiments, the switch directly connected to the storage system 740'—i.e., the switch 722'—may be a more powerful, larger capacity switch than the other one or more switches between the switch 722' and the host system 702', and the switch 722' may be considered a core switch.

The storage system 740' may include any of: masking table 754; device table(s) 756; processing nodes 744, 746, 774 and 776; FEPs 744a, 744b, 746a, 746b, 774a, 774b, 776a and 776b; RAs (not shown); RAPs (not shown); BEs (not shown); physical storage devices 760 (not shown); path components logic 790; port ranking logic 792; a PCT 794 (e.g., the PCT 1000); a PRT 796 (e.g., the PRT 1100); other components; and any suitable combination of the foregoing. The storage system also may include a plurality of storage processing nodes (e.g., director boards) 744, 746, 774 and 776, which include FEPs 744a-b, 746a-b, 774a-b and 776a-b, respectively. The storage system further may include other physically discrete components (e.g., engines) 745 and 746. The physically discrete component 745 may include the processing nodes 744 and 746, and the physically discrete component 775 may include the processing nodes 774 and 776.

The device table(s) 756 may define properties of LSUs of the storage system 740', including logical devices (which may include thin devices) corresponding to the physical storage devices, as described in more detail elsewhere herein. The masking table 754 may define which host ports (e.g., 712a, 712b, 714a, 714b, 782a, 782b, 784a, 784b) are permitted to communicate with which LSUs over which FEPs (e.g., 744a, 744b, 746a, 746b, 774a, 774b, 776a, 776b). Masking tables are described in more detail elsewhere herein.

The path components logic 790 may be configured to determine the path components associated with I/O paths, for example, as described in more details elsewhere herein. The path component logic 790 may be configured to populate the PCT 794 with the determined path component information, modify such information as necessary, and communicate such information to the host system 702', where such information can be used by the redirection logic 705 to redirect failed I/O communications. The host system 702' may include a copy of the PCT 794 or portions of the information therefrom to be used by the redirection logic 705 to redirect failed I/O communications. The path components logic 790 may be implemented as part of a director and/or a management module described in more detail elsewhere herein.

FIG. 13 illustrates an example of a PCT 1300, according to embodiments of the invention. Other embodiments of a PCT, for example, variations of the PCT 1300, are possible and are intended to fall within the scope of the invention. The PCT 1300 may be an implementation of the PCT 1000 and/or the PCT 794. For example, the PCT 1300 may serve as an example of the PCT 1000 in which a separate column is provided for each type of path component. The PCT 1300 may illustrate an embodiment in which the processing nodes 744, 746, 774 and 776 are director boards included in engines 745 and 775.

The PCT 1300 may include a plurality of entries 1301, each entry 1301a-f representing an I/O path on the storage network 1200. Each entry may specify a host ID and a target port ID in a host column 1302 and a target port column 1303, respectively, and the combination of the host port ID and the target port ID may serve as a unique identifier of than I/O path between a host system and a target system. If should be appreciated that the host port and target port also may be considered path components.

Each entry 1301a-f also may specify: a director ID in a director column 1304; an engine ID in an engine column 1306; an SSP ID in SSP column 1308; an SHP ID in SHP column 1310; a switch ID in a switch column 1312; a VLAN ID in a VLAN column 1314; and an HBA ID in an HBA column 1316. For illustrative purposes, in each entry, the value shown in columns 1302-1316 is a reference number from FIG. 12 for a path component represented in the column. For example, the I/O path represented by the entry 1301a has the following associated path components: the host port 714b; the target port 74a, the director 744, the engine 745, the SSP 720g, the SHP 720c, the switch 720', the VLAN 725 and the HBA 1316. For ease of reference, the I/O paths represented by entries 1301a, 1301b, 1301c, 1301d, 1301e, and 1301f are referenced herein as Path A, Path B, Path C, Path D, Path E and Path F.

The port ranking logic 792 may be configured to determine the health of each FEP on the storage system 740' and rank the FEPs based on the determined health of each FEP, for example, as described in more details elsewhere herein. The port ranking logic 792 may be configured to populate the PRT 796 with the port health and ranking information, modify such information as necessary, and communicate such information to the host system 702', where such information can be used by the redirection logic 705 to redirect failed I/O communications. The host system 702' may include a copy of the PRT 796 or portions of the information therefrom to be used by the redirection logic 705 to redirect failed I/O communications. The port ranking logic 792 may be implemented as part of a director and/or a management module described in more detail elsewhere herein.

FIG. 14 illustrates an example of a PRT 1400, according to embodiments of the invention. Other embodiments of a PRT, for example, variations of the PRT 1400, are possible and are intended to fall within the scope of the invention. The PRT 1400 may be an implementation of the PRT 1100 and/or the PRT 796. For example, the PRT 1400 may serve as an example of the PRT 1100 in which a rank of a port may be determined from the position in the PRT of an entry representing the port.

The PRT 1400 may include a plurality of entry 1401, including 1401*a* and 1401*c-f*. Each entry may specify an FEP in an FEP column 1302 and a health score in health score column 1303 for the FEP represented by the entry, and may specific other information in one or more other information columns 1304. The FEPs represented by entries 1401*c*, 1401*d*, 1401*e* and 1401*f* correspond to the target ports specified in by entries 1301*c*, 1301*d*, 1301*e* and 1301*f*, respectively, of the PCT 1300, i.e., to the target ports of Paths C, D, E and F, respectively. The FEP represented by the entry 1401*a* corresponds to the target port specified in entries 1301*a* and 1301*b*, i.e., to the target port of Paths A and B.

FIG. 15 is a block diagram illustrating an example of a method 1500 of determining path components of an I/O path and ranking storage system ports, according to embodiments of the invention. Other embodiments of a method of determining path components of an I/O path and ranking storage system ports, for example, variations of the method 1500, are possible and are intended to fall within the scope of the invention. While method 1500 is described in relation to FEPs of a storage system that are communicatively coupled (e.g., across a switching fabric) to host ports, it should be appreciated that the method may be applied to ports of a storage system communicatively coupled to other storage systems (e.g., for data migration, tiered storage, remote replication, etc.), back-up appliances (e.g., ProtectPoint™ available form Dell EMC), and other types of storage network components.

The method 1500 may include traversing (e.g., looping through) a list of FEPs on a storage system. For each FEP, for each I/O path associated with the FEP, the path components associated therewith may be determined, and a health ranking of the FEP relative to other FEPs may be determined. The method 1500 may be performed continuously or at predetermined times (e.g., periodically), for example, according to a schedule. The method 1500 also may be performed in response to an event (e.g., user input, system initialization or system reboot).

In a step 1502, it may be determined if there is a next FEP of a list of FEPs of a storage system to be traversed. The list of FEPs may be available in any of a variety of data structures, for example, on the storage system.

If it is determined in the step 1502 that there is a next FEP, then, in a step 1504, it may be determined whether there is next I/O path between the host system and the storage system that includes the FEP currently being considered (the current FEP). For example, the step 1504 may include accessing a masking table, a zoning table obtained from a switch or another data structure that maintains a list of I/O paths (e.g., permitted I/O paths) for an FEP.

If it is determined in the step 1504 that there is a next I/O path, then in a 1506, the path components for the I/O path currently being considered (the current I/O path) may be determined. The path components determined may include the one or more path components that include each port on the I/O path. The one or more path components that include a port may include: physical components; and logical groupings of ports. The physical components including a port may include, but are not limited to: a switch; an HBA; and physically discrete components of a storage system, for example, a director board or an engine. The logical groupings of ports may include, but are not limited to a fabric, a VLAN or an IP sub-network.

In some embodiments, the storage network on which the host system and the storage system reside is an Ethernet-based storage network, meaning that components of the network (e.g., host systems, storage systems and switches) exchange I/O communications on the storage network in accordance with one or more Ethernet-based protocols such as, for example, iSCSI, Fibre Channel over Ethernet (FCoE) and NVMe-over-TCP. In such embodiments, determining the path components of an I/O path may include any of: determining the media access control (MAC) address of one or more switches, and/or ports thereof, on the I/O path, determining a virtual local area network (VLAN) and/or IP sub-network to which the ports on the I/O path belong.

The path components of I/O paths may be determined in any of a variety of ways. For example, a storage system may query (e.g., periodically) one or more network components, for example, switches, host systems and other storage systems to glean such information, and such information may be stored on various data structures, on the storage system and/or elsewhere, that may be accessed as part of performance of the step 1506.

In a step 1507, a PCT (e.g., 1000, 794, 1300) may be updated with any changes to path components of the I/O path since a last time the path components were determined. A first time that the step 1506 is performed for an FEP, updating the PCT may include populating the PCT for a first time.

If it is determined in the step 1504 that there is a not a next I/O path, then, in a step 1506, the health of the current FEP may be determined, for example, a health score of an FEP may be determined. The health score may be based on any of a variety of criteria, including, for example: port utilization and performance metrics, response times, reliability, number or frequency of errors, number or frequency of drops, other criteria or any suitable combination of the foregoing. The information used to calculate the score may be timebound. For example, a predefined window of time—i.e., how far to look back—may be defined, and the information used to calculate the health score may be limited to this window of time. For example, the window of time may be one week before the calculation is made until present time, one month before until present time, etc., and errors or packet drops that occurred before this window of time may not be considered. In some embodiments, the information used to calculate a health may be weighted relative to the temporal proximity to the time at which the health score is calculated—e.g., the closer to the calculation time, the greater the weight.

Determining a health score also may include use of prediction algorithms and the like that predict future performance, utilization, reliability, etc. based on past activity. The health score may be expressed as a numerical value within a predefined range, for example, a number between 0 and 10, e.g., as illustrated in FIG. 14. The health score may be expressed in other ways.

After the performance of the step 1508, the method 1500 may return to the step 1502. If it is determined in the step 1502 that there is not a next FEP to be considered, e.g., that all FEPs for the storage system have been considered, then, in a step 1510, the FEPs may be ranked based on the health determined for each FEP, e.g., based on the health score of each FEP. In a step 1512, a PRT (e.g., 1100, 796, 1400) may be updated with any changes to FEP rankings since the last time that the step 1510 was performed for the storage system. A first time that the step 1510 is performed for an FEP, updating the PRT may include populating the PRT for a first time.

In a step 1514, the determined path components information and FEP ranking information may be shared with other network components of the storage network. For example, in some embodiments, the steps 1502-1512 are performed on the storage system, at least the PCT and PRT are stored on the storage system, and the step 1514 includes sharing the determined path components information and FEP ranking information (in the PCT and/or PCT or otherwise), or portions thereof, with a host system, another storage system, a backup appliance or other network components. This sharing may be achieved using storage network protocol technology, including custom commands of a storage network protocol. For example, in some embodiments, an SCSI protocol may be employed, in which one or more FEPS of the storage system maintains SCSI log pages including the path component information and FEP ranking information (e.g., in custom fields). Other network components (e.g., host systems) may obtain such information by issuing SCSI log sense commands to the FEP to interrogate the SCSI log pages. These SCSI log sense commands may be vendor unique (VU) log sense commands configured to interrogate the determined path component information and FEP ranking information components information in the SCSI log pages on the storage system (e.g., in a PCT and/or PRT, and/or derived from information therein).

The method 1500 may end after performance of the step 1514, and may be repeated immediately or at a later time according to a schedule or in response to an event.

In some embodiments of the invention, determining the health of FEPs and ranking the FEPs is performed independently of, e.g., concurrently to, determining path components of I/O paths between a storage system and a host system.

FIG. 16 is a block diagram illustrating an example of a method 1600 of redirecting a failed I/O communication, according to embodiments of the invention. Other embodiments of a method of redirecting a failed I/O communication, for example, variations of the method 1600, are possible and are intended to fall within the scope of the invention.

In a step 1602, failure of an I/O communication transmitted on a first I/O path may be detected. For example, a host system may have issued a read or write request to a storage system on the first I/O path, and no acknowledge may have been received within a predefined amount of time indicating that the I/O request was completed, or a communication may have been received explicitly indicating that the I/O request failed.

In response to the detection of a failed I/O communication on the first I/O path, in a step 1604, the host system (e.g., an MP driver thereof) may select an alternative I/O path from amongst the remaining I/O paths based on path components associated with remaining I/O paths and/or port rankings of target ports on the remaining I/O paths. For example, an MP driver (e.g., PowerPath) may determine which of the remaining I/O paths between the host system and the storage system has the least amount of associated path components in common with the failed I/O path. The host system may make this determination based on the path components information that the host system obtained from the storage system, as described in more detail elsewhere herein.

For example, referring to FIGS. 12 and 13, if Path A, defined by the entry 1301*a*, fails, then host system may select from amongst Paths B-F, defined by entries 1301*b-f*. This selection may include determining and selecting the I/O path from among the Paths B-F that has the least amount of associated path components in common with the failed I/O Path A. In FIG. 13, path components of any of Paths B-F that are different than the corresponding path component of the Path A are shaded. The Path F represented by the entry 1301*f* has the least amount of path components (none) in common with the Path A. Accordingly, a performance of the step 1604 on storage network having the I/O path information illustrated in the PCT 1300, in response to a failure of the Path A, may result in the selection of the Path F for redirection of the failed I/O communication. As a result, if the failure of the I/O communication was caused by any of the path components listed in columns 1302-1316 for the Path A, e.g., a logical error or physical failure of any of such path components, the I/O communication failure will not be repeated on the Path F, as the path F has none of same path components as the Path A.

In some embodiments of the invention, some types of path components may be given greater weight than others in selecting an alternative I/O path. For example, physical components (switches, ports, director boards, engines) associated with an I/O path may be given greater weight than logical components (e.g., logical groupings (e.g., VLANs, IP sub-networks, logical fabrics)) associated with an I/O path, or switches may be given greater weights than director boards, etc. In such embodiments, determining which of the remaining I/O paths between the host system and the storage system has the least amount of associated path components in common with the failed I/O path may not involve simply adding the number of components that are not in common, but may involve calculating a non-commonality score in which certain types of path components are given greater weight than others in determining the non-commonality score. It should be appreciated that in embodiments in which types of path components are not weighted, a non-commonality score may be simply the total number of path components not in common, or a value reflective thereof.

In some embodiments, in addition to path components on remaining I/O paths, the selection of an alternative I/O path in the step 1604 may be based on the health of target ports on the remaining I/O paths. For example, an overall score for each I/O path may be calculated by combining a health score of the target port of the I/O path with a non-commonality score of the I/O path, or logic may be applied that otherwise factors in a health score of a target port. For example, if a health score of a target port is below a certain threshold, an I/O path having the next least amount of path components in common with the failed I/O path, and whose target port health score satisfies the threshold, may be selected for redirection of an I/O communication.

For example, referring to the health components and FEPs scores illustrated in PCT 1300 and PCT 1400, if a target port health score threshold of 9 is defined, only Paths C and D have target port health scores (10 and 9.7) that satisfies the threshold. Although the Paths E and F have less path components in common with the failed Path A, the Path D may be chosen if an I/O communication on the Path A fails because, as illustrated in FIG. 13, the Path D is the I/O path having the next least amount of components in common (5) with the Path A, and that also satisfies the target port health threshold (Paths E and F do not satisfy the threshold).

In another embodiment, if two I/O paths have a same number of path components not in common with a failed I/O path, the I/O path of the two that has a higher target port ranking may be selected. It should be appreciated that the host system (e.g., MP driver) or any other component on a storage network may be configured with logic to use a non-commonality score and a target port health score in any of a variety of ways to determine which of the remaining I/O paths to select for redirection of a failed I/O communication.

In a step 1606, the failed I/O communication may be re-sent to the storage system on the I/O path selected in the step 1604. It may be desirable to redirect an I/O communication on an I/O path between the host system and the storage system having the least amount of associated path components in common with the failed I/O path to reduce a likelihood of another communication failure. That is, if the host system does not know the exact cause of an I/O failure—i.e., of what path component caused the failure—it may be desirable to redirect on an I/O path that has a best chance of not encountering the same cause of the failure, e.g., the I/O path with the least amount of associated path components in common with the failed I/O path. It may be desirable to redirect an I/O communication on an I/O path whose target port is healthy (e.g., whose health satisfies a predefined threshold) to reduce a likelihood of a reduced performance, or even another communication failure, as a result of poor target port health.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1500 and 1600, or parts thereof, may be implemented using one or more of the systems and/or data structures described in relation to FIGS. 1-14, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage network including a storage system, another network component, and a plurality of permitted input/output (I/O) paths between the storage system and the other network component, each permitted I/O path including a plurality of ports, each port being included within one or more path components, each path component being a physical component or a logical grouping of ports, wherein each permitted I/O path is associated with a plurality of path components, the plurality of path components including each of the one or more path components within which a port of the I/O path is included, a method comprising:
    detecting a failed I/O communication on a first I/O path of a plurality of permitted I/O paths;
    determining a weighted non-commonality score for each of one or more remaining I/O paths, wherein the one or more remaining I/O paths include each of the plurality of permitted I/O paths other than the first I/O path, wherein said determining the weighted non-commonality score for said each remaining I/O path includes:
        determining non-common path components of said each remaining I/O path that are not included in the first I/O path;
        assigning a weight to each of the non-common path components of said each remaining I/O path, wherein said assigning includes assigning each physical component of the non-common path components a greater weight than each logical component of the non-common path components, wherein said each logical component is denoted by a logical grouping of ports; and
        determining the weighted non-commonality score for said each remaining I/O path in accordance with the non-common path components and the weights assigned to the non-common path components;
    selecting a second I/O path from among the one or more remaining I/O paths based at least in part on the weighted non-commonality score for each of the one or more remaining I/O paths; and
    re-sending the failed I/O communication on the second I/O path.

2. The method of claim 1, wherein each of the plurality of permitted I/O paths includes a storage system port, and wherein the method further comprises:

for each of the plurality of permitted I/O paths, determining a health value for the storage system port included in the permitted I/O path,
wherein the second I/O path is selected based at least in part on the health value of the storage system port of the second I/O path.

3. The method of claim 2, further comprising:
ranking the storage system ports of the permitted I/O paths based on the health values of the storage system ports,
wherein the second I/O path is selected based at least in part on a ranking of the storage system port of the second I/O path.

4. The method of claim 1, further comprising:
determining the plurality of path components associated with each I/O path, the plurality of path components including a switch that includes two ports of the I/O path.

5. The method of claim 4, wherein determining the switch includes determining a media access control (MAC) address of the switch.

6. The method of claim 1, further comprising:
determining the plurality of path components associated with each I/O path, the plurality of path components including a logical network of ports that includes two or more ports of the I/O path.

7. The method of claim 6, wherein determining the logical network includes determining an IP sub-network and/or virtual local area network (VLAN) of which the two or more ports are members.

8. The method of claim 1, further comprising:
determining the plurality of path components associated with each I/O path, the plurality of path components including a storage processing node that includes a storage system port included in the I/O path.

9. The method of claim 1, further comprising:
the storage system determining the plurality of path components associated with each I/O path; and
the storage system communicating the plurality of path components to the other network component,
wherein the host system determines the one or more other I/O paths of the plurality of permitted I/O paths that have the least amount of associated path components in common with the first I/O path, selects the second I/O path from among the one or more other I/O paths, and re-sends the failed I/O communication on the second I/O path.

10. The method of claim 1, wherein the other network component is a host system.

11. A system for a data storage network including a storage system, another network component, and a plurality of permitted input/output (I/O) paths between the storage system and the other network component, each permitted I/O path including a plurality of ports, each port being included within one or more path components, each path component being a physical component or a logical grouping of ports, wherein each permitted I/O path is associated with a plurality of path components, the plurality of path components including each of the one or more path components within which a port of the I/O path is included, the system including executable logic that implements a method comprising:
detecting a failed I/O communication on a first I/O path of a plurality of permitted I/O paths;
determining a weighted non-commonality score for each of one or more remaining I/O paths, wherein the one or more remaining I/O paths include each of the plurality of permitted I/O paths other than the first I/O path, wherein said determining the weighted non-commonality score for said each remaining I/O path includes:
determining non-common path components of said each remaining I/O path that are not included in the first I/O path;
assigning a weight to each of the non-common path components of said each remaining I/O path, wherein said assigning includes assigning each physical component of the non-common path components a greater weight than each logical component of the non-common path components, wherein said each logical component is denoted by a logical grouping of ports; and
determining the weighted non-commonality score for said each remaining I/O path in accordance with the non-common path components and the weights assigned to the non-common path components;
selecting a second I/O path from among the one or more remaining I/O paths based at least in part on the weighted non-commonality score for each of the one or more remaining I/O paths; and
re-sending the failed I/O communication on the second I/O path.

12. The system of claim 11, wherein each of the plurality of permitted I/O paths includes a storage system port, and wherein the method further comprises:
for each of the plurality of permitted I/O paths, determining a health value for the storage system port included in the permitted I/O path,
wherein the second I/O path is selected based at least in part on the health value of the storage system port of the second I/O path.

13. The system of claim 12, wherein the method further comprises:
ranking the storage system ports of the permitted I/O paths based on the health values of the storage system ports,
wherein the second I/O path is selected based at least in part on a ranking of the storage system port of the second I/O path.

14. The system of claim 11, wherein the method further comprises:
determining the plurality of path components associated with each I/O path, the plurality of path components including a switch that includes two ports of the I/O path.

15. The system of claim 14, wherein determining the switch includes determining a media access control (MAC) address of the switch.

16. The system of claim 11, wherein the method further comprises:
the storage system determining the plurality of path components associated with each I/O path; and
the storage system communicating the plurality of path components to the other network component,
wherein the host system determines the one or more other I/O paths of the plurality of permitted I/O paths that have the least amount of associated path components in common with the first I/O path, selects the second I/O path from among the one or more other I/O paths, and re-sends the failed I/O communication on the second I/O path.

17. For a data storage network including a storage system, another network component, and a plurality of permitted input/output (I/O) paths between the storage system and the other network component, each permitted I/O path including a plurality of ports, each port being included within one or more path components, each path component being a physical component or a logical grouping of ports, wherein each permitted I/O path is associated with a plurality of path components, the plurality of path components including each of the one or more path components within which a port of the I/O path is included, computer-readable media having executable code stored thereon comprising:

executable code that detects a failed I/O communication on a first I/O path of a plurality of permitted I/O paths;

executable code that determines a weighted non-commonality score for each of one or more remaining I/O paths, wherein the one or more remaining I/O paths include each of the plurality of permitted I/O paths other than the first I/O path, wherein the executable code that determines the weighted non-commonality score for said each remaining I/O path includes:

executable code that determines non-common path components of said each remaining I/O path that are not included in the first I/O path;

executable code that assigns a weight to each of the non-common path components of said each remaining I/O path, wherein said executable code that assigns includes second executable code that assigns each physical component of the non-common path components a greater weight than each logical component of the non-common path components, wherein said each logical component is denoted by a logical grouping of ports; and executable code that determines the weighted non-commonality score for said each remaining I/O path in accordance with the non-common path components and the weights assigned to the non-common path components;

executable code that selects a second I/O path from among the one or more remaining I/O paths based at least in part on the weighted non-commonality score for each of the one or more remaining I/O paths; and executable code that re-sends the failed I/O communication on the second I/O path.

18. The computer-readable media of claim 17, wherein each of the plurality of permitted I/O paths includes a storage system port, and wherein the further comprises stored thereon:

executable code that, for each of the plurality of permitted I/O paths, determines a health value for the storage system port included in the permitted I/O path, wherein the second I/O path is selected based at least in part on the health value of the storage system port of the second I/O path.

19. The computer-readable media of claim 18, further comprising:

executable code that ranks the storage system ports of the permitted I/O paths based on the health values of the storage system ports, wherein the second I/O path is selected based at least in part on a ranking of the storage system port of the second I/O path.

20. The computer-readable media of claim 17, further comprising:

executable code that controls the storage system to determine the plurality of path components associated with each I/O path; and executable code that controls the storage system to communicate the plurality of path components to the other network component, wherein the host system determines the one or more other I/O paths of the plurality of permitted I/O paths that have the least amount of associated path components in common with the first I/O path, selects the second I/O path from among the one or more other I/O paths, and re-sends the failed I/O communication on the second I/O path.

\* \* \* \* \*